3,252,937
POLYMERIZATION OF ALDEHYDES WITH CATALYSTS CONTAINING METAL - TO - NITROGEN BONDS
Giulio Natta, Giorgio Mazzanti, and Paolo Longi, Milan, Italy, assignors to Montecatini Società Generale per l'Industria Mineraria e Chimica, Milan, Italy
No Drawing. Filed Feb. 15, 1961, Ser. No. 89,378
Claims priority, application Italy, Feb. 19, 1960, 2,843/60
11 Claims. (Cl. 260—67)

The present invention relates to a new method for polymerizing aldehydes in the presence of catalysts containing metallo-nitrogen bonds.

In our copending applications Serial No. 66,669, filed November 1, 1960, now abandoned, and 70,620, filed November 21, 1960, process it was disclosed that linear high polymers, having a polyacetalic structure, of aldehydes having the following general formula:

RCHO wherein R is an alkyl, cycloalkyl or alkylaryl group containing up to 10 carbon atoms, can be obtained by the polymerization of the monomer in the presence of various catalysts.

Examples of some typical catalysts used are the halides, halo-alkyls and alkyls of metals belonging to the 1st, 2nd, 3rd, 4th, 5th, 6th or 8th group of the Periodic Table according to Mendeleeff.

It has now surprisingly been found that monomers of this above formula can also be polymerized in the presence of catalysts comprising metal-nitrogen compounds in which the nitrogen atom is bound directly to the metal.

An object of the present invention is to provide a process for polymerizing aldehydes of the above formula characterized in that the polymerization is carried out at a temperature between $-20°$ and $-100°$ C. in the presence of catalysts comprising compounds having the following general formula:

$$Me_p{}^I Me^{II}[N(R^I R^{II})]_m X_n \begin{bmatrix} O{\diagup}{}^{R_1} \\ {\diagdown}{}_{R_2} \end{bmatrix}_q$$

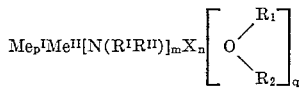

wherein $R^I$ and $R^{II}$ are equal or different alkyl, cycloalkyl (such as cyclohexyl, methylcyclohexyl), aryl, alkylaryl (such as benzyl phenylethyl) separately bonded groups or forming a heterocyclic nucleus with the nitrogen atom; $R_1$ and $R_2$ are alkyl, aryl or alkylaryl groups: $Me^I$ is an alkali metal; $Me^{II}$ is a metal belonging to the 1st, 2nd or 3rd group of the Periodic Table according to Mendeleeff; X is hydrogen or a halogen; $p$ is zero or a whole number; $m$ is a whole number and $n$ is zero or a whole number; the sum of $m+n$ is equal to the sum of the valences of $Me^I$ and $Me^{II}$ and $q$ is zero or one.

Lithium is preferably employed as $Me^I$; while beryllium, magnesium or aluminium are preferably employed as $Me^{II}$, and $Me^{II}$ may be lithium when $p$ is zero.

Several of the compounds comprised in the above mentioned general formula are already known in the specialized literature, others are prepared according to our copending application No. 39,219, filed June 28, 1960. The preparation of the catalyst is shown in the issued literature by Natta, Mazzanti, Longi and Bernardini in Chim. e Industria, vol. 42, p. 457, and by Longi, Mazzanti and Bernardini in Gazz. Chim. Ital., vol. 90, p .180, and in British Patent No. 912,404.

Very small amounts of catalysts are generally sufficient to obtain high monomer conversions, especially when employing monomers having a high degree of purity. In this case, when using such a pure monomer, a concentration of the order of $10^{-6}$ mols of catalysts per mol of monomer to be polymerized is sufficient.

The polymerization temperatures are preferably between $-60°$ and $-80°$ C.

The polymerization can be carried out in block, without the use of diluents. Solvents, which are inert under the polymerization conditions and do not solidify at temperatures at which said polymerization is carried out, may also be used. For example, propane, pentane, n-heptane, iso-octane, toluene, di-ethylether and di-iso-propylether, or mixtures thereof, are suitable for use as the inert solvent.

The polymerization can be carried out under various operating conditions, either continuously or batchwise. For instance, the catalysts, or a solution of the catalyst in an inert solvent, may be added to the monomer or to a monomer solution which has been cooled to the polymerization temperature, and the particular activity of the catalyst can thus be regulated by regulating the addition rate of the catalyst.

If it is desired to obtain a polymer having a more restricted molecular weight distribution, it is convenient to operate with a constant amount of catalyst. This can be achieved by adding small amounts of the previously purified monomer to the polymerization zone.

In the event that the polymerization is carried out continuously, the catalyst solution and the aldehyde (or its solution), both previously cooled, can be continuously introduced separately into a suitably cooled reaction apparatus so as to keep the temperature in the desired range for the whole path of the fluids. Even after just a few hours of polymerization, high monomer conversions to high molecular weight linear polymers are achieved.

It has now been found that the homopolymers obtained by the process of the present invention are crystalline and contain a high percentage of macromolecules possessing, at least for long portions of the chain, an isotactic structure.

The presence of macromolecules having a regular structure, which regularity permits the existence of crystalline regions, can be demonstrated by X-ray examination using a Geiger counter, of the crude polymers present in the powdered state, in which state these polymers are found after the polymerization prior to any annealing treatment.

By extraction with suitable selective solvents it is possible to isolate from the crude polymers, fractions having different degrees of crystallinity which variation in crystallinity is attributable to a different degree of stearic regularity in the macromolecules. Substantially amorphous noncrystallizable fractions consisting of atactic macromolecules or macromolecules having a degree of stearic order which is insufficient for a determination of their crystallinity by X-ray examination, are also isolated.

The aldehyde polymers obtained by the process of the present invention possess a very high molecular weight. The fractions extractable with solvents from the crude polymerization products in fact possess intrinsic viscosity corresponding to molecular weights in the order of hundreds of thousands.

The polymers, obtained by the process of the present invention, possess a thermal stability higher than those obtained with known catalysts, e.g., with catalysts consisting of organometallic compounds containing halogen atoms. This is particularly true when the purification of the polymers, obtained upon using said known catalysts, is not particularly careful.

The stability of the polymers, obtained according to the process of the present invention, can be increased by employing stabilization processes based on reactions which suitably modify in an analogous manner the terminal groups in the linear polymers of formaldehyde.

The polymers of the present invention can be used (preferably after their thermal stability has been improved) as plastics, employing conventional moulding and shaping methods.

The amorphous polymers exhibit elastomeric properties and thus can be used for preparing special elastic rubbers.

The more crystalline fractions of the polymers are more useful for preparing films and textile fibres.

The following examples illustrate the present invention without limiting its scope.

*Example 1*

10 cc. of freshly rectified n-butyraldehyde are poured while under nitrogen-atmosphere, into a 50-cc. test tube provided with a side tube for introducing nitrogen.

The test tube is cooled to −80° C. and 0.005 g. of Al[N($C_6H_5$)$_2$]$_3$ in 1 cc. of benzene are added. The immediate formation of an abundant gelatinous precipitate is observed, and, after a few minutes, the mass becomes completely solid. After about 1 hour, 10 cc. of n-butanol are added under nitrogen, the mixture is agitated and then 20 cc. methanol are added.

The white solid product thus obtained is filtered, washed several times with methanol and then dried under reduced pressure by heating to 40° C.

The polymer thus obtained amounts to 7.2 g. (corresponding to a monomer conversion of 88%) and is demonstrated to be partially crystalline by X-ray examination.

9.2% of the polymer is extractable with boiling acetone. The extracted fraction consists of a low-molecular weight amorphous polymer.

23.6% of the remaining polymer fraction is extractable with boiling di-isopropyl ether and possesses an intrinsic viscosity (determined in toluene at 30° C.) of about 0.13. This extractable fraction consists of a polymer which is demonstrated to be partially crystalline by X-ray examination. The extraction residue consists of an isotactic polymer which is demonstrated to be highly crystalline by X-ray examination.

*Example 2*

The same procedure is followed as in Example 1, but a solution of 0.052 g. of N-carbazyl lithium

(Li[N($C_{12}H_8$)])

in 5 cc. of anhydrous ethyl ether is used as the catalyst.

At the end of the polymerization, the catalyst is removed from the polymer by a treatment with methanol. 4 g. of a polymer which is demonstrated to be highly crystalline by X-ray examination, having an appearance similar to that obtained in the preceding example, are obtained. The raw and unstabilized polymer possesses a high thermal stability even under reduced pressure (weight loss at 90° C. and 0.5 mm. Hg=0.5% by weight per hour).

*Example 3*

The same procedure is followed as in Example 1, but 0.05 g. of LiAl[N($C_6H_5$)$_2$]$_3$H.O($C_2H_5$)$_2$ dissolved in 10 cc. of ethyl ether, are used as catalyst. The purification of the polymer obtained (3.5 g.) is carried out as described in Example 1.

*Example 4*

Upon operating in the presence of a catalyst comprising 0.05 g. of Mg[N($C_2H_5$)$_2$]Br in 10 cc. of ethyl ether, the polymerization proceeds more slowly than in the preceding examples and therefore several hours are necessary to obtain 4 g. of a polymer having a high crystallinity, as demonstrated by X-ray examination. 90% of this polymer is not extractable with boiling di-isopropyl ether.

*Example 5*

By operating in the manner described in Example 1, 20 cc. of freshly distilled acetaldehyde are polymerized at −80° C., in the presence of 0.05 g. of LiAl[N($C_6H_5$)$_2$]$_3$ H.O($C_2H_5$)$_2$ in 10 cc. of ethyl ether.

After 2 hours, the completely solid polymerization product is treated with n-butanol, methanol and then dried under reduced pressure at a temperature not higher than 40° C. 5 g. of solid polymer in the form of coarse white clots, having a high crystallinity, as demonstrated by X-ray examination, are obtained.

5.2% of this polymer is extractable with boiling acetone, while 84.4% is not extractable with boiling diisopropylether.

*Example 6*

The same procedure is followed as in Example 5, but a catalyst comprising 0.02 g. of Al[N(CH$_3$)$_2$]$_3$, dissolved in 2 cc. of benzene, is used.

After 4 hours of polymerization, the mass, which becomes completely solid, is treated as described in the preceding example.

2 g. of solid acetaldehyde polymer, not containing fractions soluble in boiling acetone, are obtained.

About 50% of this polymer is extractable with boiling diisopropyl ether.

By employing as catalyst 0.015 g. of Be[N(CH$_3$)$_2$]$_2$ instead of 0.02 g. of Al[N(CH$_3$)$_2$]$_3$ the same results were obtained.

Many variations and modifications can of course be made without departing from the spirit of the present invention.

Having thus described the present invention, what it is desired to secure and claim by Letters Patent is:

1. A process for polymerizing aldehydes of the following formula:

RCHO 

wherein R is selected from the group consisting of alkyl, cycloalkyl and alkylaryl groups containing up to 10 carbon atoms, characterized in that said aldehydes are polymerized in the presence of a catalyst comprising a compound having the following general formula:

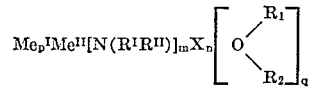

wherein $R^I$ and $R^{II}$ are each selected from the class consisting of alkyl, cycloalkyl, aryl groups and a group in which $R^I$ and $R^{II}$ are present in a heterocyclic nucleus formed from $R^I$ and $R^{II}$ together with the nitrogen atom; $R_1$ and $R_2$ are each selected from the class consisting of alkyl, and aryl groups; $Me^I$ is an alkali metal; $Me^{II}$ is a metal selected from the group consisting of the 1st, 2nd and 3rd groups of the Mendeleeff Periodic Table; X is selected from the class consisting of hydrogen and bromine; p is selected from the group consisting of zero and a whole number; m is a whole number; n is selected from the group consisting of zero and a whole number; $m+n$ is the sum of the valences of $Me^I$ and $Me^{II}$ and q is selected from the group consisting of zero and one.

2. A process according to claim 1, characterized in that the polymerization is carried out at a temperature between −20° and −100° C.

3. A process according to claim 1, characterized in that the polymerization is carried out at a temperature between −60° and −80° C.

4. A process according to claim 1, characterized in that the catalyst is dissolved in an inert solvent.

5. A process according to claim 4, characterized in that the inert solvent is selected from the group consisting of benzene and ethyl ether.

6. A process according to claim 1, characterized in that the polymerization is carried out in the presence of a catalyst having the formula:

Al[N($C_6H_5$)$_2$]$_3$ 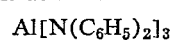

7. A process according to claim 1, characterized in that the polymerization is carried out in the presence of a catalyst having the formula:

$$LiAl[N(C_6H_5)_2]_3H.O(C_2H_5)_2$$

8. A process according to claim 1, characterized in that the polymerization is carried out in the presence of a catalyst having the formula:

$$Mg[N(C_2H_5)_2]Br$$

9. A process according to claim 1, characterized in that the polymerization is carried out in the presence of a catalyst having the formula:

$$Al[N(CH_3)_2]_3$$

10. A process according to claim 1, characterized in that the polymerization is carried out in the presence of a catalyst having the formula:

$$Be[N(CH_3)_2]_2$$

11. A process according to claim 1, characterized in that the polymerization is carried out in the presence of a catalyst having the following formula:

$$Li[N(C_{12}H_8)]$$

References Cited by the Examiner

UNITED STATES PATENTS

| | | | |
|---|---|---|---|
| 2,084,213 | 6/1937 | Osterhof | 260—67 |
| 2,849,432 | 8/1958 | Kibler et al. | |
| 2,989,511 | 6/1961 | Schnizer | 260—67 |

OTHER REFERENCES

Furukawa et al.: Makro. Chem., vol. 33 Sept. 1959), pp. 32–40.

Kern et al.: International Symposium on Macromolecular Chem., June 14–18, 1960, Moscow, U.S.S.R.; Papers and Summaries, Sec. II, pages 280–285.

WILLIAM H. SHORT, *Primary Examiner.*

MILTON STERMAN, LOUISE P. QUAST,
*Examiners.*